United States Patent
Popall et al.

(10) Patent No.: US 6,283,578 B1
(45) Date of Patent: Sep. 4, 2001

(54) HYDROPHOBIC COATING FOR INK JET PRINTING HEADS

(75) Inventors: Michael Popall, Würzburg; Jochen Schulz; Birke-E. Olsowski, both of Veitshöchheim; Adelheid Martin, Wittinghausen; Karl Bühler, München, all of (DE)

(73) Assignee: Pelikan Produktions AG (CH)

( * ) Notice: Subject to any disclaimer, the term of this patent is extended or adjusted under 35 U.S.C. 154(b) by 0 days.

(21) Appl. No.: 09/029,127

(22) PCT Filed: Jun. 26, 1997

(86) PCT No.: PCT/DE97/01339

§ 371 Date: Jun. 11, 1998

§ 102(e) Date: Jun. 11, 1998

(87) PCT Pub. No.: WO98/00295

PCT Pub. Date: Jan. 8, 1998

(30) Foreign Application Priority Data

Jun. 28, 1996 (DE) .............................. 196 26 052

(51) Int. Cl.$^7$ ..................................... B41J 2/135
(52) U.S. Cl. ................... 347/45; 347/20; 347/67
(58) Field of Search ................. 347/45, 20, 67; 260/544; 428/1; 523/109; 427/240

(56) References Cited

U.S. PATENT DOCUMENTS 5,378,504 * 1/1995 Bayard et al. ................... 347/45
5,945,169 * 8/1999 Netti et al. .................... 427/430.1

FOREIGN PATENT DOCUMENTS 196 13 650
  C1       4/1997  (DE) .
0 367 438 A1  5/1990  (EP) .
WO 96/06895  * 3/1996  (EP) .................. C09D/183/08
0 716 051 A2  6/1996  (EP) .
WO 90/14958  12/1990  (WO) .
WO 96/06895   3/1996  (WO) .

* cited by examiner

Primary Examiner—John Barlow
Assistant Examiner—Manish Shah
(74) Attorney, Agent, or Firm—Fay, Sharpe, Fagan, Minnich & McKee, LLP

(57) ABSTRACT

The invention provides inkjet print head which has an Anti-wetting Coating of a polymer material, which is produced with the utilization of at least one Compound (I) $X_a R_b SiR^1_{(4-a-b)}$ with X=hydrolyzable group, R=possibly substituted Alkyl, Aryl, Alkenyl, Alkylaryl or Arylalkyl, $R^1$=organic remainder with at least one polymerizable group, a=to 3, b=0 to 2. In addition, a Process for the Manufacture of the Print Heads is made available, as well as a Means for the Coating of same.

13 Claims, No Drawings

HYDROPHOBIC COATING FOR INK JET PRINTING HEADS

The present invention concerns inkjet printheads with anti-wetting-coating. The term "anti-wetting"-coating signifies, vis-a-vis the ink, a hydrophobe coating, specifically a jet plate coating.

An essential pre-requisite for a clean print image of an inkjet operating-based printer is a symmetrical droplet form, i.e. there must be no unilateral influence upon the ink when exiting from the print head. Since inkjet print heads are customarily manufactured in sandwich-type construction and may consist of highly different materials, (silicon-wafer/channel-like structured polymer (PARAD)/Polyimide-Layer/alkaline earth glass) the print head, up to now, has usually been vaporized with a fluorine compound in order to produce a uniform anti-wetting-layer at the ink jet exits. The vaporization process is extremely costly and leads to unsatisfactory results. Furthermore, the face surface of the inkjet print head, which is rough as a result of sawing, must have been polished prior to vaporization, i.e. it must have been lapped, that is to say, smoothed out via costly and time-consuming process.

Specifically with respect to the circumstance that disposable print heads have in the meantime come on the market, which are each time exchanged together with the ink cartridge, the above described vaporization process, including its prerequisites, proves too expensive.

It is, therefore, the object of the invention to discover an anti-wetting-coating material which adheres well to the substrate material, and having hydrophobic properties with respect to the ink, which can be inexpensively applied and is cost-friendly.

Said object is solved by making available an Inkjet Print Head according to claim 1 and, in specifically beneficial fashion, according to the Sub-claims 2 to 7.

Preference is given to the use of Compounds I as sole or principal component for the manufacture of the polymer material.

The anti-wetting-coating of the present invention is suitable for each type of jet exit surfaces (for example jet plate, with sandwich construction, side shooter, edge shooter, back shooter). It is, among others, chemically inert vis-a-vis the different ink systems, because it does not swell upon contact with ink. Depending upon the ink system to be employed, the wetting properties can readily be optimally adjusted or adapted by means of variation of the respective chemical groups.

The basic materials can be easily stored and are environmentally friendly.

By application of a material according to claim 1 as anti-wetting-layer, good adhesion is obtained with respect to the materials utilized for the heads; excellent compatibility with the thermal expansion of the layer-bonding has the result that the applied layers will not chip or flake off, even after being rejected to stress over a longer period of time. Wetting angles relative to water are achieved in the range of 80° to more than 90°, and in some cases up to more than 100°. Surprisingly, it was also discovered that with Inkjet Print Heads coated according to the invention, the roughness of the face surface due to wafer sawing is planarized. There also exists capability of pinhole-free application.

Specifically, via a process according to claim 12, there is guarantee, in particularly beneficial manner, that the channels themselves are not pasted up with the coating.

Polymer materials as defined in claim 1, belong to a material category of the so called ORMOCERS (ORganically MOdified CERamics). They may be ranked among the inorganic and organic polymers. Production takes place starting from alkoxides of silicon, and possibly, as supplement to other metals, which are totally or partially modified by organically polymerizable substituted groups. Via hydrolysis and condensation, the inorganic part of the network is formed, via polymerization, polyaddition or other organic coupling reactions the organic part (of reactive organic substituted groups).

The following systems have proven themselves as particularly suitable for use as polymer material for anti-wetting-coating.

TABLE 1

| G-(Mol-%) | P(Mol-%) | 2(Mol-%) | M(Mol-%) | T(Mol-%) |
|---|---|---|---|---|
| 30–40 | — | 10–20 | 30–40 | 0–5 |
| — | 70–90 | — | 15–25 | — |
| — | 80–95 | — | 5–15 | — |
| — | 65–75 | — | 20–40 | — |
| — | 35–45 | 25–35 | 20–40 | — |
| — | 50–70 | 25–35 | 5–15 | — |

G = Glycidoxypropl-trimethoxysilane;
P = Phenyl-trimethoxysilane;
P2 = Diphenyl-silandiol;
M = Methacryl-oxypropyl-trimethoxysilane;
T = Tetra-ethoxy-silane.

The preferred manufacturing method for the material is that the desired silanes are first mixed with any other perhaps required additives (for example network builders or modifying substances), and, if required, under calefaction, hydrolyzed by addition of water. Addition of water can be done slowly, so that the system is initially supplied with sub-stoichiometrical quantities.

In one embodiment of the invention, the systems also contain one amino component, for example N-methyldiethanolamine (NMDA) and/or diethylenetri-amine (DETA). This can act as an accelerator. The two aforementioned substances are preferably employed at a ratio of approximately 1:1 and in a volume of approximately 0.5–2, preferably approximately 1 volume-% relative to undiluted lacquer.

The liquid lacquer, produced as described above, is brought, where required, to a desired solid matter contents and can subsequently be applied as such on the print head or, as is preferred, in combination with a solvent (for example ethanol, acetone, propylacetate or similar). The preferred application procedure is spraying. Alternative possibilities are, for example, spin-coating, roll-application or tampon print. Additional possibilities are off-set print, application by brush or immersion application. The mode of application is usually selected in such manner that optimum adaptation is possible with respect to head geometry and head production sequence. After the application, the material is hardened (organically polymerized). This can be done for example via photo-chemical and/or thermal method, whereby, of course, for photo-chemical hardening photo-initiators need to be added to the lacquer, prior to application. In case of spray application, one can, for example, operate with a spray precompression of 0.5 to 2 bar, for example (jet cross sections: 0.1 to 0.3 mm). Spray distance can, for example, be 3 to 10 cm, specifically approximately 6 cm. In order to prevent any clogging of the fine inkjet exit apertures, Nitrogen can be passed through each print head, for example with a counter pre-compression of 0.5 bar.

Suitable photoinitiators are known to a person skilled in the art. For example, radically-ionic initiators can be employed such as Cyracure UVI 6974 by Union Carbide.

Adding amines such as N-methyldiethanolamine and/or Diethylenetriamine shortly before application is particularly beneficial, even with utilization of radical photostarters such as for example Quantacure ITX (Rahn Chemie). The photo-initiators can, for example, be added in amounts of 1–5 mass-%, preferably approximately 2 mass-%, relative to the undiluted lacquer.

The solid matter contents of the lacquer produced in the initial phase is variable. For example, it can amount to between 30 to 80%. The adjustment is preferably made via rotary incorporation. Subsequently dilution with solvents is also variable and depends upon several to be selected factors, for example upon the type of application. The lacquer can, for example, be brought to a final solid matter contents of approximately 5 to 30% by means of solvents.

Excellent layer qualities are obtained with a lacquer which was brought by means of rotary incorporation to approximately 60 to 70% by weight of solid matter contents and was then diluted by solvents (for example Propylacetate) to a solid matter contents of approximately 10% by weight.

According to the invention, it is also possible to apply a second hydrophobic layer, for example of a fluorized hydrolyzed silane. Thus, a Perfluoralkl-triethoxysilane may be used.

Preferably, both these layers are jointly hardened (thermally and/or photo-chemically). Furthermore, the anti-wetting-layer according to the invention can be developed from several layers of the material according to the invention, which are applied successively and are of identical or different compositions.

EXAMPLES

1. Basic Compounds for the Lacquers

| System | G-(Mol-%) | P(Mol-%) | 2(Mol-%) | M(Mol-%) | T(Mol-%) |
|---|---|---|---|---|---|
| GMP2T | 38.6 | — | 18.9 | 38.6 | 3.9 |
| PM82 | — | 80 | — | 20 | — |
| PM91 | — | 90 | — | 10 | — |
| PM73 | — | 70 | — | 30 | — |
| PP2M433 | — | 40 | 30 | 30 | — |
| PP2M631 | — | 60 | 30 | 10 | — |

2 Lacquer Synthesis
 2.1 Synthesis of GMP2T
Starter Compounds
 1. 0.4 mol g-Glycidopropyltrimethoxysilane (=38.6 mol-%)
 2. 0.4 mol g-Methacryloxypropyltrimethoxysilane (=38.6 mol-%)
 3. 0.2 mol Diphenylsilandiol (=18.9 mol-%)
 4. 0.04 mol Tetraethoxysilane (=3.9 mol-%)
 5. 2.37 mol water Components 1–4 are introduced and stirred at room temperature for 18 hours. Subsequently, the suspension is heated within 90 minutes to approximately 70° C. After the suspension has become clarified, ¼ of the amount of water is added while firing is maintained. In time intervals of approximately 20 minutes, the remaining water is added (in amounts of ¼ each). After all the water has been added, stirring is continued for one hour at 70° C. Subsequently, firing is eliminated and after cooling down, the lacquer is ready to use.

2.2 The other lacquers are produced similarly to GMP2T.

3. Manufacture of the Anti-wetting-coating on the Inkjet Printer.

3.1 Manufacture of the material to be applied.

Lacquers having the above described compositions are adjusted by rotary incorporation to a solid matter contents of 66.5% by weight and diluted with ethanol or propylacetate to 5–40% by weight of solid matter contents.

3.2 Application of Coating on the Print head.

With an air brush (type Aerostar 105 by Messrs. Fischer) the lacquer is sprayed with a spray pressure of 0.5 or 2.0 bar (et cross section 0.2 mm) at a spraying distance of approximately 6 cm onto the front sides of the fully assembled inkjet print heads. Nitrogen is passed through each head with a reverse supply pressure of 0.5 bar. Subsequently, all systems are photo-chemically hardened (initiator: Cyracure UVI 6974 by Union Carbide).

One portion of the lacquers additionally contains N-Methyldiethanolamine (NMDA) and Diethylenetriamine (DETA) at a ratio of 1:1.

Exposure time is 15 seconds. Subsequently, as is apparent from Table 3, some of the systems are thermally after-baked.

4. Ink Storage Test (70° C.; 150 hours; commercially available ink-water/alcohol basis) Specimens for the ink storage tests are produced under the following conditions: Solid matter percentage in the spray lacquer: approximately 7% by weight; Solvent: Propylacetate; Photo initiator: Cyracure UVI 6974 (3% by mass relative to undiluted lacquer); Amines: NMDA +DETA (1:1; 1% by mass relative to undiluted lacquer); Hardening: 60 seconds with 500 W (Loctite).

The following adhesion values (=GT) and wetting angles (vis-a-vis water) are ascertained prior to (=index v) and after (=index n) the ink storage test.

TABLE 3

| System | therm. hardng. | Substrate | $GT_v$ | $GT_n$ | $angle_v$ | $angle_n$ |
|---|---|---|---|---|---|---|
| GMP2T | 1 h/80° C. | Glass | 0 | 0 | 79° | 78° |
|  | " | Wafer | 0 | 0 |  |  |
|  | " | Parad | 0.5 | 0.5 |  |  |
|  | " | Vacrel | 0 | 0.5 |  |  |
| GMP2T[a] | 16 h/80° C. | Glass | 0.5 | 0.5 | 74° | 66° |
|  | " | Wafer | 0 | 0 |  |  |
|  | " | Parad | 0 | 0 |  |  |
|  | " | Vacrel | 0 | 0.5[b] |  |  |
| PM82 | " | Glass | 0 | 5 | 80° | 61° |
|  | " | Wafer | 0.5 | 5 |  |  |
|  | " | Parad | 0 | 5 |  |  |
|  | " | Vacrel | 0 | 5 |  |  |
| PM82[a] | 16 h/80° C. | Glass | 0.5 | 0.5 |  |  |

TABLE 3-continued

| System | therm. hardng. | Substrate | $GT_v$ | $GT_n$ | $angle_v$ | $angle_n$ |
|---|---|---|---|---|---|---|
| | " | Wafer | 0 | 0 | | |
| | " | Parad | 0.5 | 0.5 | | |
| | " | Vacrel | 0 | 5[b] | | |
| PM91[a] | 16 h/80° C. | Glass | 1 | 1 | 77° | 42° |
| | " | Wafer | 0.5 | 1.5 | | |
| | " | Parad | 1 | 1.5 | | |
| | " | Vacrel | 0.5 | 4[b] | | |
| PM73 | " | Glass | 0 | 0 | 75° | 70° |
| | " | Wafer | 0 | 0 | | |
| | " | Parad | 0 | 0.5 | | |
| | " | Vacrel | 1 | 1 | | |
| PM73[a] | 16 h/80° C. | Glass | 1 | 1 | 72° | 91° |
| | " | Wafer | 1 | 1 | | |
| | " | Parad | 1 | 1 | | |
| | " | Vacrel | 1 | —[c] | | |
| PP2M433 | 1 h/80° C. | Glass | 0 | 0 | 78° | 79° |
| | " | Wafer | 0 | 0 | | |
| | " | Parad | 0.5 | 0.5 | | |
| | " | Vacrel | 0 | 0 | | |
| PP2M433[a] | 16 h/80° C. | Glass | 1 | 1 | 82° | 76° |
| | " | Wafer | 1 | 1 | | |
| | " | Parad | 1 | 1 | | |
| | " | Vacrel | 1 | 1[b] | | |
| PP2M631 | 1 h/80° C. | Glass | 0 | 0 | 79° | 73° |
| | " | Wafer | 0 | 0 | | |
| | " | Parad | 2 | 2 | | |
| | " | Vacrel | 2 | 2 | | |

[a]165 hours ink storage instead of 150 hours
[b]Adhesion problem Vacrel Wafer (partial separation of vacrel)
[c]Vacrel separated from wafer, therefore adhesion determination no longer possible.

System GMP2T shows the best adhesion values before and after the ink storage test. System PP2M433 also provides comparably satisfactory results, and likewise has a comparably high wetting angle (if not even somewhat higher). System PM73 has the greatest hardness and thus probably also highest smearing resistance. It also has satisfactory adhesion with respect to the different substrates.

Best wetting angles (up to more than 100° C.) are obtained with two-layer systems, in which the second layer is formed by a fluor-silane.

The obtained surface thickness of the anti-wetting coating is approximately 5 to 30μ.

Another, for the application essential property of the systems is their planarization capacity of rough surfaces. This makes possible the use of Si-components which have only been sawed—in other words, the time-consuming and thus cost-intensive lapping process can be eliminated in the manufacture of the Inkjet Print Heads.

Having thus described the invention, we now claim:

1. Inkjet Print Head, characterized in that it has an Anti-wetting Coating of polymer material, said Anti-wetting coating is formed in at least two layers, wherein an outer layer consists of perfluoroalkyltrialkoxysilane or contains said perfluoroalkyltrialkoxysilane, said polymer material is manufactured by utilization of at least one compound I $$X_a R_b SiR^1_{(4-a-b)} \qquad \text{I}$$

With X=hydrolyzable group
R=optionally, substituted alkyl, aryl, alkenyl alkylaryl or arylalkyl,
R$^1$=organic remainder with at least one polymerizable group,
a=1 to 3
b=0 to 2.

2. Inkjet Print Head according to claim 1, characterized in that the Compound I is selected among alkytrialkoxysilanes, aryltriakoxysilanes, diarylkoxysilanes as well as hydrolysis products of these silanes.

3. Inkjet Print Head according to claim 1, characterized in that the polymer material is manufactured with utilization of at least one compound from the group Glycidoxypropyltrimethoxysilane, Phenyltrimethoxysilane, Diphenylsilandiol and Methacryloxypropyltrimethoxysilane.

4. Inkjet Print Head according to claim 3, wherein the polymer material is manufactured with utilization of Glycidoxypropyltrimethoxysilane, Methacryloxypropyltrimethoxysilane, Diphenylsilandiol and Tetraethoxysilane.

5. Inkjet Print Head according to claim 1, characterized in that the Anti-wetting Coating has a thickness ranging from 5 to 50μ.

6. Process for the manufacture of anti-wetting-coated Inkjet Print Heads comprising forming a polymer material from at least one compound $$X_a R_b SiR^1_{(4-a-b)} \qquad \text{I}$$

With X=hydrolyzable group
R=optionally, substituted Alkyl, Aryl, Alkenyl Alkylaryl or Arylalkyl,
R$^1$=organic remainder with at least one polymerizable group,
a=1 to 3
b=0 to 2, and spraying said polymer material onto the Inkjet Print Head while an inert gas is counter-conducted through inkjet openings.

7. Process according to claim 6, characterized in that the material, in form of lacquer from pre-condensed starter compound(s) through addition of water, is optionally applied, with a solvent, onto the Inkjet Print Head and subsequently finish-cured photochemically and/or thermally.

8. Process according to claim 6, characterized in that the material is sprayed on optionally with a solvent.

9. Process according claim 6, characterized in that Propylacetate is used as solvent.

10. An Anti-wetting Coating for Inkjet Print Heads, said Anti-wetting coating comprising a polymer material, said Anti-wetting coating being formed in at least two layers, wherein an outer layer consists of perfluoroalkyltrialkoxysilane or contains perfluoroalkyltrialkoxysilane, and said polymer material is produced from at least one Compound I $$X_a R_b SiR^1{}_{(4-a-b)} \qquad \text{I}$$

With X=hydrolyzable group
R=optionally, substituted Alkyl, Aryl, Alkenyl Alkylaryl or Arylalkyl,
$R^1$=organic remainder with at least one polymerizable group,
a=1 to 3
b=0 to 2.

11. An Anti-wetting Coating for Inkjet Print Heads according to claim 10, characterized in that the Compound I is selected from among Alkyltrialkoxysilanes, Aryltrialkoxysilanes, Diaryldialkoxysilanes, as well as Hydrolysis Products of these Silanes.

12. An Anti-wetting Coating for Inkjet Print Heads according to claim 10, characterized in that the polymer material is produced from a compound selected from the group consisting of Glycidoxypropyltrimethoxysilane, Phenyltrimethoxysilane, Diphenylsilandiol and Methacryloxypropyltrimethoxysilane and mixtures thereof.

13. An Anti-wetting Coating for Inkjet Print Heads according to claim 10 wherein said Anti-wetting coating is deposited directly adjacent said print head.

* * * * *